Patented May 19, 1953

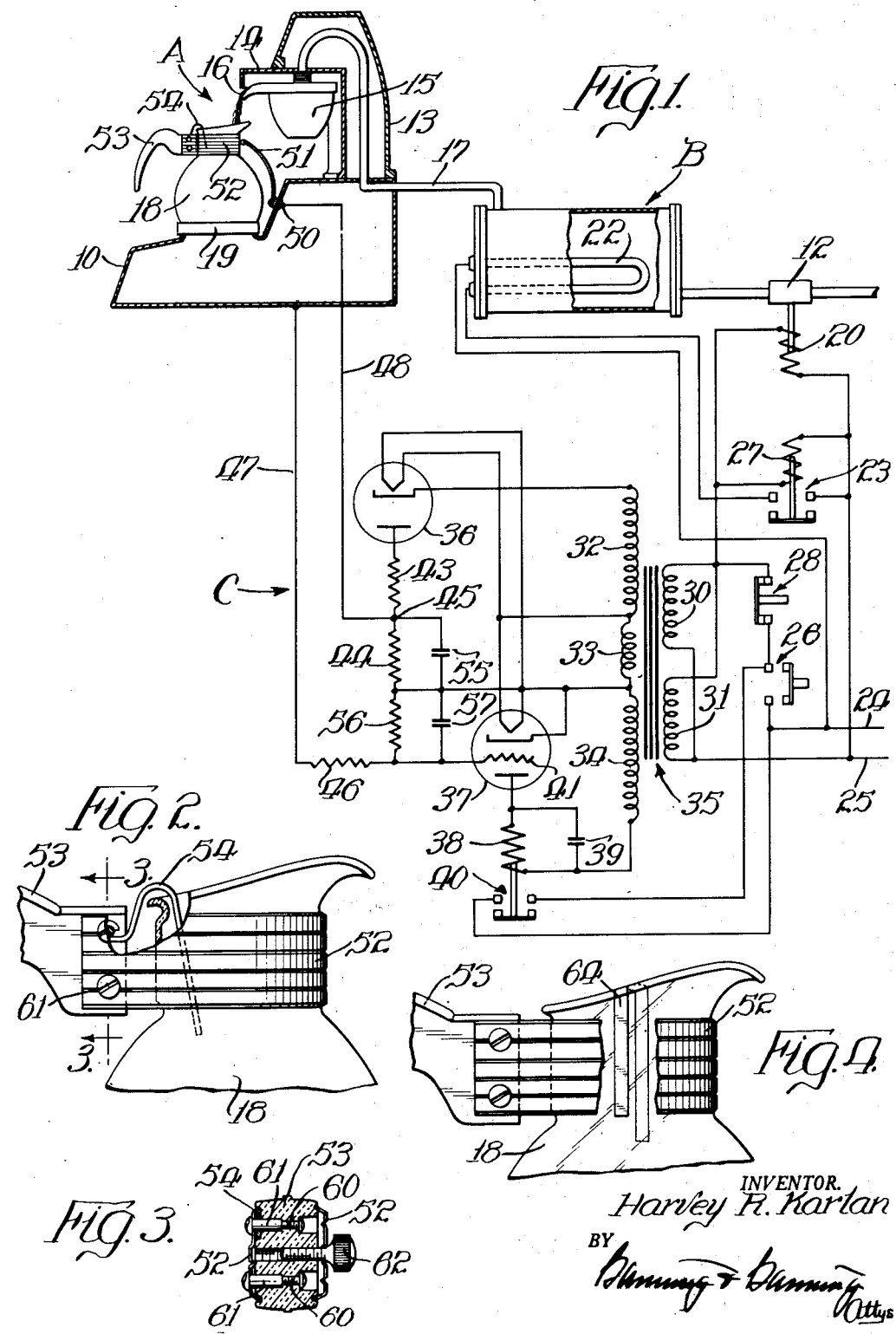

2,639,078

UNITED STATES PATENT OFFICE

2,639,078

RECEPTACLE FILLING AND LIQUID LEVEL CONTROL SYSTEM

Harvey R. Karlen, Chicago, Ill., assignor to Cory Corporation, Chicago, Ill., a corporation of Delaware Application September 28, 1949, Serial No. 118,341

9 Claims. (Cl. 226—127)

This invention relates to automatic control systems and apparatus, and particularly liquid level controls; and it has to do more especially with electrical as distinguished from mechanical means for automatically shutting off a stream of liquid when a receptacle into which the stream is flowing is filled to a predetermined level.

The invention as herein illustrated is an adjunct of automatic coffee brewing equipment and will be dealt with as such in the ensuing detailed description; but there are many other uses to which it may profitably be put, as will be evident to those who are versed in the art of automatic liquid level controls.

In automatic coffee brewers of the type wherein hot water is supplied to and percolates through a mass of ground coffee contained within a refillable cartridge and thence flows by gravity into a decanter or other receptacle, it has been a common practice to utilize a weight-responsive mechanism in the nature of a beam scale on which the decanter is supported and which functions automatically to interrupt the flow of hot water when the decanter is filled with coffee brew to a predetermined level. Mechanisms of that character are capable of completely satisfactory operation, but their accuracy is dependent in considerable measure upon their being kept reasonably clean and in proper adjustment. In many instances the brewers are owned and operated by people who expect them to function indefinitely without attention or servicing of any kind, aside from the visible exterior surface. Few precision mechanical devices can meet such unreasonable expectations, and this is true of such beam scale mechanisms. The result is that no adequate servicing is regularly given, and ultimately something breaks down.

As applied to coffee brewers, the primary object of this invention is to provide dependable means for automatically shutting off the flow of hot water and liquid coffee brew when the receiving decanter is filled to a predetermined level, and which is unlikely to become adversely affected by wear or accumulated foreign deposits.

A further object is to provide means of this character which does not entail need of special attention on the part of the person operating the brewer, and which does not in any way impede placement and removal of the decanter.

Still another object is to provide apparatus for carrying out these various objects and which can easily be maintained in a strictly sanitary condition.

More broadly, it is an object of the invention to provide a non-mechanical system and apparatus, as well as a novel method, for automatically shutting off a stream of liquid flowing into a receptacle whenever the liquid level in the receptacle rises to a certain predetermined height, provided only that the liquid be slightly conductive electrically.

In its application to coffee brewers, the invention contemplates a normally closed, electrically-operated water shut-off valve in combination with a manually operable starting switch and an electronic relay operative, when energized, to close the holding switch, said relay having a control circuit which includes the pool of coffee brew in the receiving decanter and also, preferably, the stream of coffee brew flowing into the decanter, together with an electrode which makes contact with the coffee brew in the decanter when the decanter is filled to a predetermined level and thus closes the control circuit which is effective through the relay to close the water shut-off valve. When the relay control circuit is closed through the pool of coffee brew, a negative cut-off potential is resultantly applied to the control grid of the relay, thus interrupting the plate current and consequently de-energizing the holding switch winding and causing the contacts thereof to open and the water shut-off valve to close.

Because aqueous coffee brew is an exceedingly poor electrical conductor, and further because it is not permissible from the standpoint of safety or in accord with Underwriters' requirements to employ more than a few volts, I have not been able to find or devise an electro-mechanical relay capable of reliable operation on the infinitesimally small current available for operation of the present control system as applied to coffee brewers; and for that reason I have found it necessary to make use of a highly sensitive electronic relay which is responsive to voltage alone and not dependent upon current flow in the control circuit thereof. However, when the invention is applied to control of the flow of liquids of higher conductivity, or when conditions are such that higher voltages are permissible, it will be possible to substitute for the electronic relay a simple, inexpensive electro-mechanical relay, or even dispense with the use of a relay entirely.

Referring now to the drawing which accompanies this specification—

Figure 1 is a schematic diagram illustrating an application of the invention to an automatic coffee brewer;

Fig. 2 shows, in elevation, the top portion of a decanter to which is attached a metal collar and a conductive probe;

Fig. 3 is a transverse section taken at line 3—3 of Fig. 2; and

Fig. 4 is a view similar to Fig. 2 illustrating a modification wherein the probe is a metallic stripe adhered to the surface of the decanter.

Referring first to Fig. 1, there is illustrated in vertical section a more or less diagrammatic representation of an automatic coffee brewing apparatus A having a water heater B which ordinarily is installed within the housing of the apparatus, but is otherwise shown in furtherance of clarity. An electronic relay C is also included in this figure of the drawing.

The brewer A includes a sheet metal housing 10 within which is usually installed the water heater B together with a solenoid-operated valve 12 which controls the flow of water to the heater. Mounted on the housing 10 is a head 13 which carries a holder 14. A replaceable coffee cartridge 15 which is detachably connected to the holder 14 to depend therefrom is provided with a discharge spout 16. A conduit 17 extends from the water heater B to the holder 14 and serves to conduct hot water which, when the valve 12 is open, passes from the heater into the cartridge and upwardly through the mass of ground coffee therein for escape by gravity out of the spout 16 into a decanter 18 which rests on an electrically-heated hot plate 19 mounted on the housing 10.

The valve 12 is normally closed, but opens upon energization of its winding 20 and remains open only so long as this winding continues energized. Water in the heater B is continuously maintained at a moderate temperature by a heater element (not shown), and a second heater element 22 of relatively high wattage serves to quickly increase the temperature in response to closure of a solenoid-operated switch 23.

Alternating current is supplied through a pair of line conductors 24 and 25. When the manually operable starting switch 26 is closed, parallel circuits are then completed through the winding 20 of the valve 12 and through the winding 27 of the switch 23. Thus, the valve 12 is opened and the heater 22 is energized whenever the switch 26 is closed so that coffee brew will almost immediately start flowing from the spout 16 into the decanter 18, provided there is a serviceable charge of ground coffee then in the cartridge 15.

It is possible for the operator to hold the switch 26 closed until the decanter 18 is sufficiently filled, thus dispensing with the automatic liquid-level control about to be described; but doing so would entail a good deal of lost time and so is not done except in rare instances when the automatic control may temporarily be out of order.

Momentary closure of the manual starting switch 26 establishes a connection between the line conductors 24, 25 and the two primary windings 30 and 31 of a power transformer 35, and as a result voltage is induced across the three series-connected secondary windings 32, 33 and 34. It will be observed that the secondary winding 32, together with the secondary winding 33, supplies space current to a diode rectifier 36 and that the secondary winding 34 supplies space current to a triode 37 while the winding 33 supplies a filament heating current to both tubes. Both the diode 36 and the triode 37 are normally de-energized and both become energized upon closure of the starting switch 26.

Included in the plate circuit of the triode 37 is the winding 38 of an electromagnetic switch 40. This winding is energized in response to closure of the transformer primary circuit and thereupon closes the contacts of the switch 40 which are in shunt to the contacts of the starting switch 26. The control grid 41 of the triode 37 is normally at cathode potential, thus permitting the space current to flow until a negative cut-off potential is subsequently impressed thereon in the manner hereinafter described. The valve 12 is accordingly held open and the switch 23 held closed as long as the contacts of the switch 40 remain closed, and this condition will continue until the space current through triode 37 is cut off.

The space current path of the diode 36 includes two resistors 43 and 44 in series. It will be obvious that the D. C. potential at terminal 45, resulting from the flow of space current through the diode and through said resistors, is more negative than the D. C. cathode potential of the triode 37. Assuming appropriately selected parameters, the potential at the terminal 45 has a negative value, with respect to the cathode potential, such that if applied to the control grid 41 of the triode 37 the flow of space current through the triode will be cut off, thus causing de-energization of the winding 38 and consequent opening of the contacts of the switch 40 which immediately results in closure of the valve 12 and opening of the contacts of the switch 23.

The control grid 41 is connected through a resistor 46 and conductor 47 to the metal housing 10 of the coffee brewer apparatus A, and the terminal 45 is connected through a conductor 48 to a terminal or binding post 50 which is supported by the housing 10 but electrically insulated therefrom. Connected at its lower end to the binding post 50 and supported thereby is an upwardly projecting resilient metal arm 51 which, when the decanter is positioned on the hot plate 19, makes contact with a sheet metal collar 52 embracing the neck of the decanter and serving both as an electrical conductor and as a medium for attaching the lifting handle 53 to the decanter. A wire probe 54 is electrically connected at one end to the collar 52 and extends, as best shown in Fig. 2, over the top rim of the decanter and thence downwardly inside the decanter where it terminates at a level to which the decanter is to be filled with coffee brew. When the decanter is thus filled, a circuit is established from the negative terminal 45 through the conductor 48, binding post 50, arm 51, collar 52, probe 54, the pool of coffee brew in the decanter, the stream of coffee brew flowing from the spout 16 into the decanter, the conduit 17, the housing 10 which is electrically connected to said conduit, and the conductor 47 and resistor 46 to the control grid 41. Thus the potential of the grid 41 is instantly lowered to cut-off with the result that the valve 12 is instantly closed, and at the same time the energizing circuit of the heater element 22 is opened.

The capacitors 39 and 55 are filter elements serving to unify the direct current flow through the winding 38 and the resistor 44, respectively. The resistor 56 is a grid leak serving normally to maintain the control grid 41 at cathode potential; and the capacitor 57 functions conjointly with the resistor 56 to form a time-delay loop the purpose of which is to maintain the control grid 41 at cut-off potential for a measurable period of time once the probe 54 has contacted the pool of coffee brew in the decanter. Without this provision the control grid could go alternately between cut-off and non-cut-off potentials, thus repeatedly opening and closing the switch 40 in rapid succession and in turn the switch 23, and valve 12 until the level of the coffee brew finally reached a point at which it could maintain continuous contact with the end of probe 54. To prevent such fluttering of the switch 40 and resultant fluttering of the valve 12 and switch 23, it is necessary only to maintain the initial cut-off potential on the grid 41 long enough to keep the switch 40 open during the succeeding surge from the secondary winding 34 following the opening of the transformer primary circuit.

If for any reason it is desired to shut off the flow of coffee brew before the decanter is filled to the level at which the automatic control goes into operation, this can be done by manually opening the pushbutton switch 28. This switch is included in the transformer primary circuit and serves to interrupt the current supply to the electronic relay and at the same time to the windings 26 and 27.

The sectional view, Fig. 3, shows how the handle 53 is clamped between the two end portions of the collar 52 and also illustrates a convenient and satisfactory mode of anchoring the probe 54 while retaining the same in electrical connection with the collar. It will be seen that one end portion of the collar is secured to the handle by means of two screws 60, each engaging a nut 61 having a screw-slotted head bearing against the outer surface of the collar, while the other end portion of the collar is detachably secured to the handle by means of a thumbscrew 62. The anchored end of the probe 54 is coiled to form an eyelet which encircles the upper nut 61 and is seated in a recess formed in the handle underneath the adjacent end portion of the collar 52 with which the eyelet makes contact, being clamped between the handle and the contiguous inner surface of the collar. Since there is normally a certain amount of breakage of glass decanters consequent upon use thereof, it is important that provision be made for quick and easy removal and attachment of the collar 52. This is readily accomplished with the construction illustrated and described.

In the modification of Fig. 4 I have dispensed with the wire probe 54 and substituted in its place a metal stripe 64 which is firmly adhered throughout its length to the surface of the glass. This stripe extends from the exterior of the decanter neck where contact is made with the collar 52, over the top rim and downwardly inside the neck to a point coinciding with the level to which it is desired to fill the decanter. A metal stripe 64 so disposed performs the same function as the wire probe 54 of Fig. 2.

Instead of two separate tubes 36 and 37, I may prefer to use a single twin triode, in which case the grid associated with the rectifier half of the tube is connected directly to the adjacent cathode.

The automatic liquid level control system of this invention is readily capable of being so sturdily constructed that it is unlikely to require servicing for long periods of time, save possibly for occasional vacuum tube renewals which can be performed without prolonged interruptions, provided a spare tube is kept at hand. Moreover, should a failure occur in any part of the system, it will result in shutting off the flow of hot water, there being practically no possibility of the water not being shut off in such event unless the valve 12 fails to close due to some mechanical defect.

I claim:

1. An apparatus including a receptacle, means for conducting liquid into the receptacle, an electric control circuit having a terminal in a liquid stream flowing into the receptacle and a second terminal positioned to be contacted by the pool of liquid in the receptacle, said circuit being adapted to be completed between the terminals through said liquid stream and the pool when the pool of liquid within the receptacle contacts said second terminal.

2. An apparatus including a receptacle, means for conducting liquid into the receptacle, an automatic liquid control system for shutting off the flow of liquid to the receptacle when the liquid level therein reaches a predetermined height, said control system including an electrically-operated valve for controlling the liquid flow, and a control circuit for said valve having a terminal in the liquid stream flowing into the receptacle and a second terminal positioned to be contacted by the pool of liquid in the receptacle, said circuit being adapted to be completed between the terminals through said liquid stream and the pool when the pool of liquid within the receptacle contacts said second terminal.

3. An apparatus including a receptacle, electrically-conductive means for directing a stream of liquid into the receptacle, an automatic liquid level control system for shutting off the flow of liquid to the receptacle when the liquid level therein reaches a predetermined height, said control system including an electrically-operated valve for controlling the liquid flow, a relay for controlling said valve, and a control circuit for the relay having a terminal electrically connected to the liquid directing means and a second terminal within the receptacle above the bottom thereof, said circuit being adapted to be completed between the terminals through said liquid stream and the pool when the pool of liquid within the receptacle reaches the level of the second terminal.

4. An apparatus including a receptacle, means for delivering a stream of liquid flowing through space into the receptacle, an automatic liquid level control system for shutting off the flow of liquid to the receptacle when the liquid level therein reaches a predetermined height, said control system including an electrically-operated valve for controlling the liquid flow, and a control circuit for said valve having a first terminal connected to the liquid stream flowing through space into the receptacle and a second terminal in the receptacle positioned to be contacted by the pool of liquid in the receptacle when said liquid reaches a predetermined level whereby to complete the circuit between the terminals through said liquid stream and the pool only when the level thereof reaches said predetermined level.

5. An apparatus including a receptacle, means for conducting a stream of liquid into the receptacle, a completely electrical automatic liquid level control system for shutting off the flow of liquid to the receptacle when the liquid level therein reaches a predetermined height, said control system including a normally-closed electrically-operated valve for controlling the liquid flow, an electronic relay operative when energized to open the valve and hold the same open during continued energization, said relay having a control grid normally at cathode potential to permit the flow of current, and an electrical control circuit including said control grid and having a first terminal connected to the liquid stream flowing into the receptacle and a second terminal in the receptacle positioned to be contacted by the pool of liquid in the receptacle when said liquid reaches a predetermined level, whereby to complete said circuit between the terminals through said liquid stream and the pool when the pool of liquid within the receptacle reaches said predetermined level and impress a negative cut-off potential on the grid to de-energize the electronic relay for closing said valve.

6. An apparatus including a receptacle, means for conducting a stream of liquid into the receptacle, a completely electrical automatic liquid level control system for shutting off the flow of liquid to the receptacle when the liquid level therein reaches a predetermined height, said control system including a normally-closed electrically operated valve for controlling the liquid flow, a primary circuit including a source of alternating current and a normally open starting switch in series with the actuating winding of the valve, an electrically operated normally-open holding switch having its contacts in shunt with the contacts of the starting switch, an electronic relay including a plate circuit, a control grid circuit having a grid normally at cathode potential, and a rectifier circuit, a transformer coupling the relay to the source of current through the starting switch, the actuating winding of the holding switch being included in the plate circuit, and a control circuit having a first terminal connected to the liquid stream flowing into the receptacle and a second terminal in the receptacle positioned to be contacted by the pool of liquid in the receptacle when said liquid reaches a predetermined level whereby to complete the control circuit between the terminals through said liquid stream and the pool when the pool of liquid within the receptacle reaches said predetermined level and impress a negative cut-off potential on the grid to de-energize the electronic relay for closing said valve.

7. A coffee-making apparatus including a decanter, means spaced from the decanter for directing coffee brew into the decanter, an electrically operated valve for controlling the liquid flow, an electronic relay for controlling the operation of the valve, a first terminal mounted on the decanter and extending into the same to a point coinciding with the level at which the decanter is to be filled with coffee brew, said relay having a control circuit including the terminal and having a second terminal connected to the liquid stream flowing into the decanter whereby to complete the control circuit between said terminals through said liquid stream and the pool when the pool of liquid within the decanter reaches the predetermined level and electrically contacts said first terminal, and manually operable switch means for opening said valve to start the flow of coffee brew.

8. The method for completing an electrical control circuit to operate a shut-off valve which comprises connecting one terminal of the circuit to the liquid stream controlled by the valve, positioning the other terminal of the circuit in a confined space and directing the stream into said space to form a rising pool of liquid therein to complete the circuit through the pool and stream when said pool contacts said other terminal.

9. The method for terminating the flow of a stream of liquid into a receptacle when the liquid level therein reaches a predetermined height which comprises positioning one terminal of a flow-controlling electrical circuit in said receptacle at said predetermined height and connecting the other terminal of said circuit to said stream whereby the circuit between the terminals is completed through the stream and the liquid in the receptacle when the level thereof reaches said one terminal.

HARVEY R. KARLEN.

References Cited in the file of this patent

UNITED STATES PATENTS

| Number | Name | Date |
| --- | --- | --- |
| Re. 22,879 | Peters et al. | May 13, 1947 |
| 563,464 | Fahrney | July 7, 1896 |
| 1,346,898 | Kingsbury | July 20, 1920 |
| 1,869,720 | Strand et al. | Aug. 2, 1932 |
| 2,017,368 | Magner | Oct. 15, 1935 |
| 2,202,197 | Ewertz | May 28, 1940 |
| 2,323,128 | Hare | June 29, 1943 |
| 2,433,599 | Cohen | Dec. 30, 1947 |
| 2,483,450 | Wolfner | Oct. 4, 1949 |
| 2,544,917 | Dahlem | Mar. 13, 1951 |